US009402152B2

(12) United States Patent
Bolin

(10) Patent No.: US 9,402,152 B2
(45) Date of Patent: *Jul. 26, 2016

(54) METHOD FOR FINE LOCATION OF AN SMS EMITTED FROM A MOBILE USER EQUIPMENT IN A TELECOMMUNICATION NETWORK IMPLEMENTING OPEN-MODE FEMTOCELLS

(71) Applicant: FREE MOBILE, Paris (FR)

(72) Inventor: Paquito Bolin, Saint Gély du Fesc (FR)

(73) Assignee: FREE MOBILE, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/535,572

(22) Filed: Nov. 7, 2014

(65) Prior Publication Data

US 2015/0126220 A1    May 7, 2015

(30) Foreign Application Priority Data

Nov. 7, 2013  (FR) .................................... 13 60886

(51) Int. Cl.
| | | |
|---|---|---|
| *H04M 1/00* | (2006.01) | |
| *H04M 11/00* | (2006.01) | |
| *H04W 4/00* | (2009.01) | |
| *H04W 4/02* | (2009.01) | |

(Continued)

(52) U.S. Cl.
CPC *H04W 4/02* (2013.01); *H04W 4/20* (2013.01); *H04W 64/00* (2013.01); *H04W 4/14* (2013.01); *H04W 64/003* (2013.01); *H04W 84/045* (2013.01)

(58) Field of Classification Search
CPC ........... H04W 4/02; H04W 4/14; H04W 4/20; H04W 64/00; H04W 84/045
See application file for complete search history.

(56) References Cited

U.S. PATENT DOCUMENTS

2010/0120447 A1    5/2010    Anderson et al.
2010/0135201 A1*   6/2010    Lewis ................... H04W 12/08
                                                        370/328

(Continued)

FOREIGN PATENT DOCUMENTS

EP    2 252 114    11/2010

OTHER PUBLICATIONS

Search Report for FR 13 60886 dated Jun. 30, 2014, 2 pages.

(Continued)

*Primary Examiner* — Tammy Pham
*Assistant Examiner* — Frantz Bataille
(74) *Attorney, Agent, or Firm* — Nixon & Vanderhye, P.C.

(57) ABSTRACT

The present invention relates to a mobile network (10) organized into a plurality of location areas and service areas gathering a geographically homogeneous set of cells of the mobile network, with gathering of the femtocells into specific additional service areas. The emission of an SMS from a user equipment (14) coupled to a femtocell (30) triggers a location step, with communication to a location platform of the network of a rough location comprising service area codes SAC and location area codes LAC corresponding to the femtocell, and of a fine location comprising unique data, such as IP address and INSEE code, of identification of the Internet box (20) associated to the femtocell. These data are then transmitted to the platform by the SMS management center. The femtocells may hence operate in open mode, each femtocell being able to be coupled to any user equipment registered with the mobile network operator.

20 Claims, 2 Drawing Sheets

Figure 1:
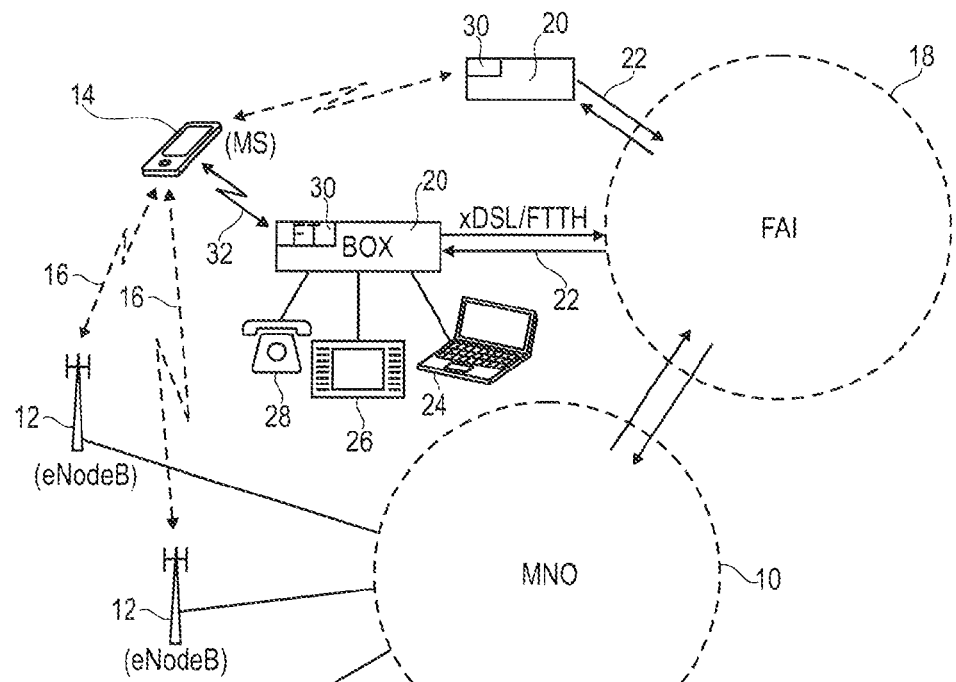

(51) Int. Cl.
  *H04W 4/20*  (2009.01)
  *H04W 64/00* (2009.01)
  *H04W 4/14*  (2009.01)
  *H04W 84/04* (2009.01)

(56) References Cited

U.S. PATENT DOCUMENTS

2011/0053609 A1   3/2011  Choi-Grogan

2013/0188624 A1*  7/2013  Lee .................. H04W 24/02 370/338
2013/0203373 A1*  8/2013  Edge ................ H04W 4/22 455/404.2

OTHER PUBLICATIONS

Search Report for FR 13 61445 dated Jun. 30, 2014.
Search Report and Written Opinion for FR 13 61444 dated Jul. 22, 2014.

* cited by examiner

METHOD FOR FINE LOCATION OF AN SMS EMITTED FROM A MOBILE USER EQUIPMENT IN A TELECOMMUNICATION NETWORK IMPLEMENTING OPEN-MODE FEMTOCELLS

This application claims priority to FR 1030886 filed 7 Nov. 2013, the entire contents of which is hereby incorporated by reference.

The invention relates to the mobile communication networks implementing femtocells.

Femtocells are mobile phone relays of very low power and reduced range (at most a few meters or tens of meters) with which a mobile phone (MS, Mobile Station) can be coupled to pass and receive voice communications, emit or receive short messages (SMS), exchange digital data, etc.

Viewed from the mobile phone, the femtocell is functionally equivalent to a macrocell relay (base station BS or eNodeB), with the same functions of roaming, inter-cell handover, etc. In particular, when the mobile phone is in the coverage area of the femtocell, the handover is made automatically from the macrocellular antenna (of the external radio network) to that of the femtocell. Likewise, when the user leaves the coverage area of the femtocell, his phone find seamlessly the macrocell network.

The specificity of a femtocell is that it is connected to a fixed terminal equipment of an Internet service provider, of the box type (called hereinafter "box" or "Internet box"), including a modem for interfacing to a wire-based IP link of the xDSL type or an optical-fibre link of the FTTH type, used to receive and emit the signals exchanged with the mobile phone coupled to the femtocell.

This technique thus uses two operators, i.e. the Mobile Network Operator (MNO) and the Internet Service Provider (ISP).

The interest of a communication via femtocells is multiple: firstly, this technique allows to serve areas where the radio coverage of the external macrocellular network is poor or very fluctuating, in particular inside houses due to the shielding effect of the surrounding superstructures; secondly, the load of the radio network is strongly reduced, because the communications are routed towards the MNO core network through the high-speed IP connection of the ISP wire-based or optical network instead of being routed via the MNO network radio interface, which may sometimes be full loaded in the very dense coverage areas.

Moreover, the implementation of femtocells is extremely simple, insofar as these latter use only pre-existing infrastructures, both at the ISP and at the MNO, and can be installed by simple connection or plugging of a "femto-module" to the ISP box (in the following of the description, by way of simplification, the term "femtocell" will simply be used to denote also this module).

The femtocells are usually of the "closed" type, i.e. the Internet box owner has to declare to the MNO the mobile phone numbers that are allowed to connect to the femtocell linked to his box, the allowed numbers being for example identified by keys contained in their SIM/USIM card, as the IMSI subscriber identifier. When the MNO receives/emits a call or a message from/to one of these numbers, if the user is not located in a macrocell of the network, the MNO will know a priori to which femtocell(s) this user is liable to be coupled. The latter may hence be easily found in the network, and also geographically located because the femtocells are connected to boxes fixedly installed at a place that is known (by the ISP), i.e. the termination of the xDSL or FTTH line used.

The invention aims, on the contrary, the implementation of a femtocell network of the "open" type, i.e. in which any subscriber of the MNO is liable to be coupled to a femtocell near which it is located, with no previous registration by the box owner and transparently for the latter.

Conversely to a closed network in which the femtocell serves only the needs of the subscriber that has installed it, on an open network, it is not possible to precisely locate calls or SMSs, whether they are emitted from a mobile phone located nearby this femtocell or to such a mobile phone.

Indeed, the only possible location in the absence of particular measurements would be that given by the "Service Areas" (SA) defined by the 3GPP specifications. These service areas may gather a relatively high number of cells as a function of their geographic situation and of a particular "service" allocated to this area: for example, the sector of intervention of a police unit, a fire brigade, etc. The 3GPP specifications allow only a limited number of such service areas per "Location Area" (LA), a location area being itself able to cover a very extended area such as a department, a big city or only a part of a big city.

Such techniques for locating a terminal connected to a femtocell in an open-type network are exposed in particular in the EP 2 252 114 A1 and US 2011/0053609 A1.

Unlike the geolocation information (geographic position of the antenna) available to the MNO in the case of a macrocell of its network, a rough location by location area/service area would be insufficient, insofar as it would not be possible to know the precise address from which the call or the message would have been emitted or to which it should be routed.

But this information must imperatively be able to be provided by the MNO within the framework of an official requisition from public authorities. Such a requisition indeed imposes the communication of the data contained in the "charging ticket" or CDR (Call Detail Record) recording all the information relative to a specifically identified phone call. This ticket contains the identities of the calling party and of the called party, the date and hour of the call, its duration, the type of call (voice, SMS, etc.) and, in the case of a call via a mobile network, the fine location of the calling party and/or of the called party.

In the case of a macrocell network, this location will be a geolocation by the latitude and the longitude of the antenna of the relay (BS or eNodeB) of the mobile network through which the call has transited.

In the case of a femtocell network operating as a closed network, this location will be possible from the previous declaration the Internet network owner will have made to the MNO regarding the users allowed to use the femtocell connected to his box.

On the other hand, in the case of a communication via an open-network femtocell, this direct identification is not possible, as the MNO is not capable to identify the femtocell precisely involved in the communication and does not know its geographical position, this information being the matter of the ISP that has provided the Internet box to which is connected the femtocell.

Such is the problem of the invention, which proposes a new method for locating the place from where has been emitted of a short message (SMS) sent from a mobile phone coupled to a femtocell operating in open mode (i.e. liable to receive SMSs coming from a phone of any subscriber of the MNO), wherein this method must be able to provide to the MNO:

not only a rough location (identification codes of the service and location areas, SAC and LAC, where the SMS emitter is located), but also a fine location allowing to precisely identify the Internet box used for sending an SMS, this box being for example identified by its IP address and/or by precise geographic information such as the INSEE code (numerical code of the official nomenclature of French communes) of the place where the box is located, i.e. the place of location of the termination of the wire-based or optical xDSL/FTTH line.

As will be seen, the method of the invention allows to obtain this fine location in any circumstances, whoever is the subscriber of the mobile network using the femtocell, and without the owner of the Internet box to which is connected this femtocell has to do any previous declaration.

The location method of the invention can hence be applied to any mobile subscriber, even simply "passing through" near the femtocell, and in a fully transparent manner for both this subscriber and the Internet box owner.

In other words, the mobile subscriber will not even be aware of the fact that he uses as a relay a nearby femtocell and not an antenna of the macrocellular network, nor of the fact that the use of this femtocell has triggered a process of fine location of the femtocell.

More precisely, the invention proposes a method for locating a short message SMS coming from a mobile user equipment in a telecommunication network comprising a MNO mobile network and an ISP fixed network. The mobile network comprises a core network with a commutation centre, an SMS storage centre, and a location platform. The fixed network comprises a fixed core network and a plurality of individual boxes forming termination equipment of the fixed network, with for each of them unique box identification data. Some of the boxes are provided with a short-range cellular emitter/receiver module of the femtocell type allowing a temporary wireless coupling with a nearby mobile user equipment.

The mobile network is organized into a plurality of location areas each identified by a location area code, and each location area gathers a set of service areas each identified by a service area code, each service area gathering a geographically homogeneous set of cells of the mobile network.

The femtocells operate in open mode, each femtocell of the mobile network being able to be coupled to any user equipment registered with the mobile network operator and being nearby the femtocell, without this user equipment has been previously registered in the individual box.

The emission of an SMS from a user equipment coupled to a femtocell triggers a sequence comprising the following steps:
a) sending by the SMS storage centre to the location platform of a user equipment location request;
b) sending by the location platform to the commutation centre of a rough location request; and
c) sending by the commutation centre to the location platform of a rough location comprising the service area and location area codes corresponding to the femtocell.

Characteristically of the Invention:
at least one of the location areas comprises specific additional service areas in which are gathered femtocell identifiers; and
said sequence of steps further comprises the following subsequent steps:
d) determination by the location platform whether the location area corresponds or not to one of said specific additional service areas in which are gathered femtocell identifiers;

e) in the affirmative, sending by the location platform to the femtocell, via the commutation centre, of a fine location request message;
f) obtaining by the commutation centre from the femtocell of a fine location comprising unique data of identification of the box associated with the femtocell; and
g) transmission of the fine location by the commutation centre to the SMS storage centre.

The method may further comprise the following final step:
h) generation, by the SMS storage centre, of an SMS data ticket added with the unique box identification data.

In a preferential embodiment, the step g) of transmission of the fine location by the commutation centre to the SMS storage centre is a step of indirect transmission comprising the following sub-steps:
g1) sending by the commutation centre to the location platform of an answer to said subscriber location request, this answer incorporating said fine location; and
g2) transmission by the location platform to the SMS storage centre of an answer to said subscriber location request, this answer incorporating said fine location.

The answer to the subscriber location request is preferably a PSL_Ack message according to the 3GPP specifications.

The unique box identification data may in particular comprise the IP address associated with the box and a geographic code of the place of location of the box.

The fine location request message may be in particular a Location Reporting Control message according to the 3GPP specifications and the answer message, a Location Reporting message according to the 3GPP specifications.

Very advantageously, the unique box identification data are encapsulated in the Location Reporting message by substitution of these data for the geographic longitude/latitude coordinates.

An exemplary embodiment of the present invention will now be described, with reference to the appended drawings in which the same references denote identical or functionally similar elements through the figures.

FIG. 1 schematically illustrates the various networks involved in the implementation of a called emitted or received through a femtocell.

Figure 2:
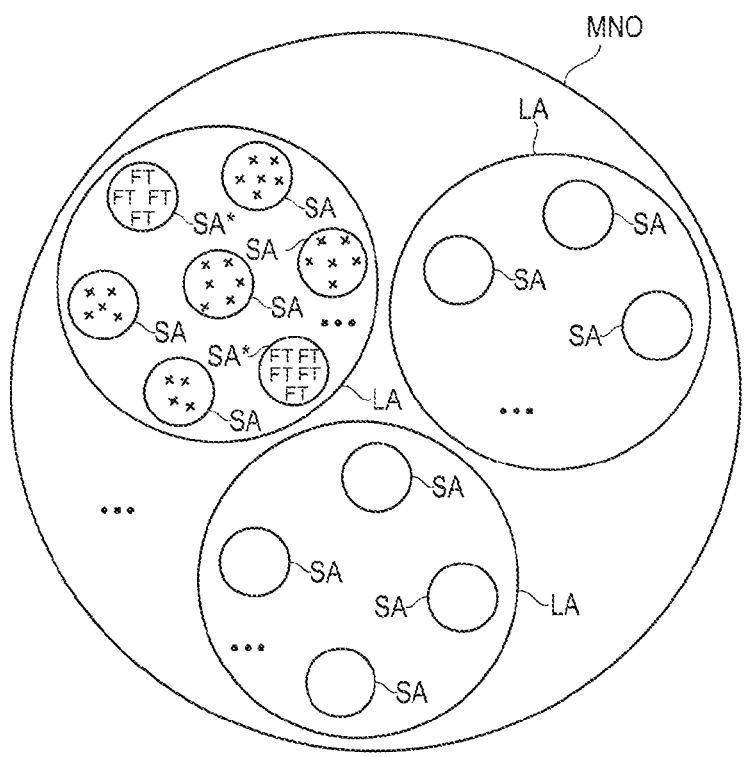

FIG. 2 symbolically shows the geographic gathering of the cells of a mobile telecommunication network into service areas, themselves gathered into a limited number of location areas.

Figure 3:
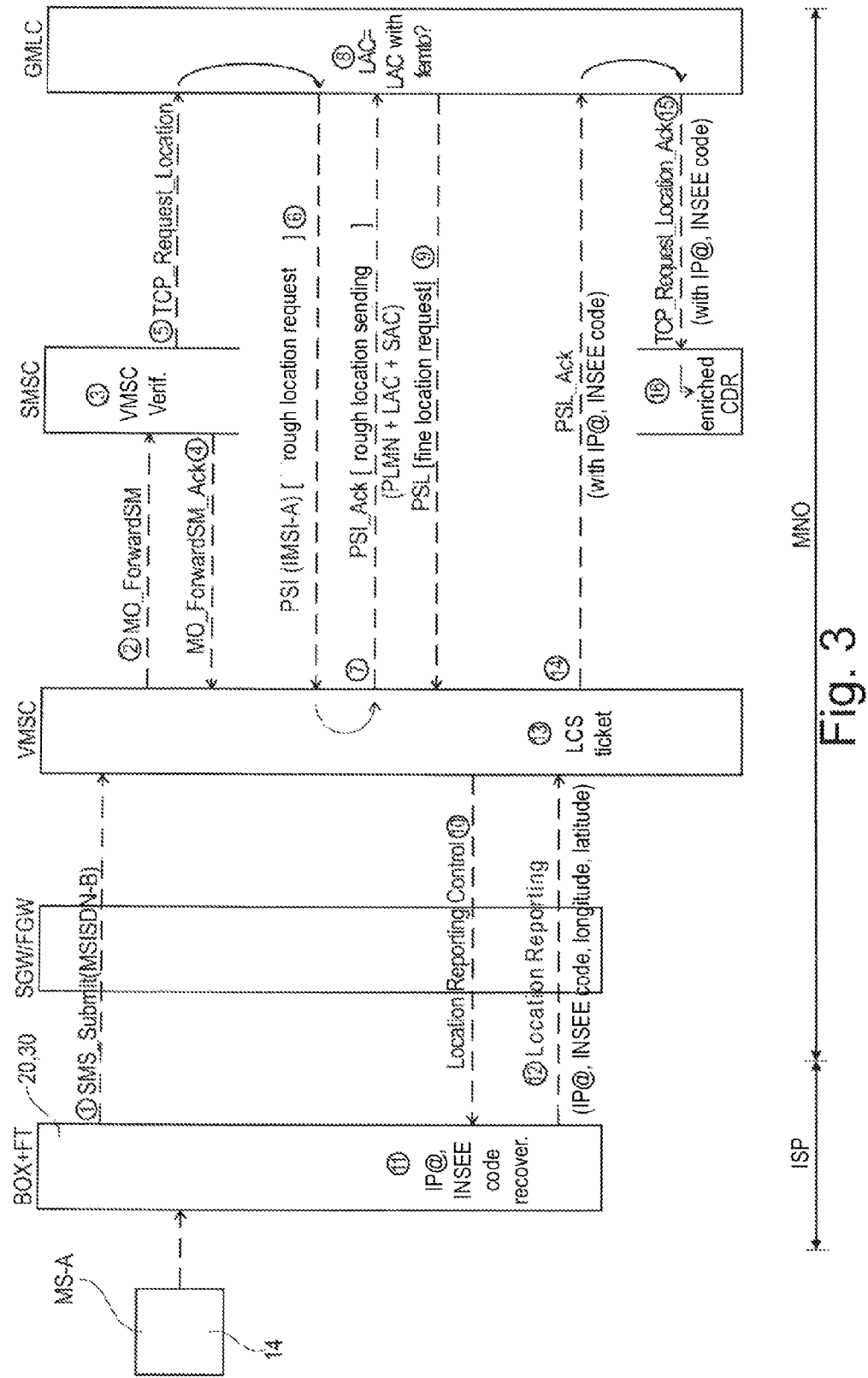

FIG. 3 is a schematic representation of the various entities of the network involved by the implementation of the location method according to the invention, showing the various messages and data exchanged between these entities.

An exemplary embodiment of the invention will now be described.

The invention will be described within the framework of a cellular network of the UMTS type, as defined by the 3GPP specifications, supposed to be known by the one skilled in the art.

By way of introduction, let's specify that, in the present invention and in the drawings, we will use the abbreviations (SAC, LAC, VMSC, CDR, etc.) and the designations (Location Reporting, Security Gateway, etc.) referring to concepts and elements defined and explained by these 3GPP specifications, and that, for this reason, these abbreviations and designations will be kept as such and won't be described in more detail than necessary.

FIG. 1 schematically illustrates the various networks involved in the implementation of a call emitted or received through a femtocell.

This set comprises a mobile telecommunication cellular core network 10 managed by a mobile network operator MNO, with a plurality of antennas 12 each defining a macrocell of a base station eNodeB, antennas to which the user of a mobile phone 14 (MS, Mobile Station) may be coupled by a wireless radio link 16.

The set also comprises a fixed telecommunication network of an Internet service provider ISP with an ISP core network 18 and a set of fixed Internet boxes (20) (denoted BOX) connected to the core network by fixed IP links 22, which are wire-based links of the xDSL type or optical links of the FTTH type.

An example of Internet box is the equipment distributed by the operator Free, Paris, France, under the name Freebox Crystal or Freebox Revolution Server. It is a multifunction interface box including an ADSL/FTTH modem and implementing functions of telephony, IP network (by Ethernet wire-based network or Wi-Fi wireless network) and television.

The Internet box 20 may be conventionally connected to one or several computers 24, to a television set 26, to a phone set 28, etc. Besides, this box is liable to receive a femtocell-type module 30 (referred to as FT) of low power and reduced range allowing a wireless radio coupling 32 with a mobile phone 14 located nearby.

As explained in introduction, the femtocell 30 is a base micro-station that is functionally equivalent, on the mobile phone side, to a base station 12 of the external macrocellular network. The difference resides in the fact that, on the operator side, this femtocell 30 plays the role of a gateway to the wire-based or optical fixed IP network of the ISP to allow the access to the MNO services from the high-speed Internet fixed network.

The femtocell is considered by the MNO as a fully-fledged cell (equivalent to an eNodeB) allowing, for example, to route via the IP network a voice call towards the switched network.

FIG. 2 symbolically shows the geographic gathering of the cells of a mobile telecommunication network into service areas, themselves gathered into a limited number of location areas.

More precisely, the cells of the MNO network are distributed between several "Location Areas" (LA) according to the 3GPP terminology. Each LA is generally implemented by an individual server, and gathers all the MNO cells located in a geographically homogeneous region, for example a French department or a big city or a sector of a big city. Each LA is identified by a LAC (Location Area Code) that is unique within the network.

Inside each LA, the cells are themselves gathered into "Service Areas" (SA) according to the 3GPP terminology, each SA being identified by a SAC (Service Area Code) that is peculiar to it and that is unique within a same LA.

The SAs are typically adapted, according to the 3GPP specifications, to gather cells allocated to i) a given service—for example an emergency service such as a police unit or a fire brigade—ii) located in a geographically homogeneous area—for example the area of intervention of a given police unit or a given fire brigade.

Characteristically of the invention, for the implementation of a network with open femtocells, the concept of the service area (SA) provided by the 3GPP specifications is used by adding to the existing SAs in a given LA (SAs that hence correspond to the macrocells of the network) additional SAs, dedicated to the femtocells. These dedicated SAs, denoted SA\* in FIG. 2, contain only femtocell (FT) identifiers and gather the femtocells in an homogeneous manner based on their geographic location, which is the physical location of the Internet box associated with this femtocell.

The allocation of a femtocell to any service area SA\* is operated once and for all during the installation of the femtocell in the Internet box: during this preliminary step, the femtocell identity is transmitted to the MNO at the same time as that of the Internet box, with its geographical location, and the MNO then allocates the femtocell to the service area SA\* that is the geographically nearest thereto.

Hence, it will be possible to make a first, rough location of a given femtocell by the SAC+LAC codes that correspond thereto in the network topology.

This first location is however insufficient. In particular, it does not allow to respond to the demands of the national authorities in case of official requisition demanding the communication of the precise place from which a call or an SMS has been emitted, or towards which a call or an SMS has been routed.

Indeed, the SAC being coded over two bytes, it is not possible to have more than 65 535 SAs per LA. It is hence not conceivable to provide as much SAs as there are femtocells present in the network (which would have solved the problem of fine location), and several femtocells have imperatively to be gathered in a reduced number of SAs, hence each containing a high number of femtocells.

The method of the invention however allows the mobile network to determine the fine location required, at the time of emission of an SMS via a femtocell, as will be explained hereinafter with reference to FIG. 3.

In FIG. 3 are shown the various entities involved by this process, with:
- the mobile phone MS;
- the unit formed by the Internet box BOX and the femtocell FT connected to the latter;
- on the MNO side:
    - the Security Gateway/Femto Gateway SGW/FGW, which ensures the interfacing of the mobile network with the femtocells, for the access and security functions. In particular, when an Internet box is reset, the SGW gateway recognizes that a femtocell has been installed on this Internet box and memorizes the characteristics of this femtocell;
    - the Visited Mobile Switching Centre VMSC, which is the entity in charge of the communication routing in the network and of the interconnection with the other, mobile or fixed networks;
    - a Short Message Service Centre SMSC, which ensures the centralisation of the SMSs emitted by the subscribers of the network, their temporary storage and their distribution to the recipients of the same network or of networks managed by other MNOs;
    - a Gateway Mobile Location Centre GMLC platform, whose function is to receive and process location requests that are submitted thereto by the core network, in particular from the SMSC, such location requests being as the case may be processed by means of other entities of the network.

When the mobile phone (MS) of the subscriber "A" (MS-A) 14 emits an SMS, this SMS is sent to the VMSC (step #1) by an SMS_Submit message, this message containing in particular the number of the recipient "B" of this SMS, identified by its MSISDN-B number.

At this stage, the VMSC has only at its disposal a very rough information of location of the femtocell, insofar as, in the SMS case (and unlike with voice calls), the normative specifications do not consider to transmit to the VMSC the SAC and LAC identifiers (although these latter are known by the gateway SGW/FGW).

The VMSC transmits back (step #2) to the SMSC the SMS submit message, with the same content but with a different protocol (MO_ForwardSM message). This message is analysed by the SMSC (step #3), in particular to verify from which entity of the core network (concretely, from which VMSC) comes the SMS, as a same operator may have several VMSCs. An acknowledgment, MO_ForwardSM_Ack, confirming the good receipt of the MO_ForwardSM message is sent back to the VMSC (step #4).

The SMSC having no location information about the just-received SMS, it sends to the GMLC platform a location request (step #5), presented in the form of a TCP_Request_Location message containing in particular:
   the MSISDN-B identifier of the recipient,
   the IMSI-A identifier of the SMS emitter, and
   the identity of the VMSC by which the SMS is transmitted.

At this stage, the system knows about the SMS emitter only the identity of the concerned VMSC, which gives no real location information, even very rough, because, even when a MNO manages several VMSCs, these latter do not really correspond to geographic areas. The system does not know the location area and service area LA/SA data because, as mentioned hereinabove, the LAC and SAC data are not transmitted with the SMS management messages.

To obtain these rough and fine femtocell location data, the GMLC will trigger a location request process.

For that purpose, the GMLC platform sends to the concerned VMSC (whose identity is given in the TCP_Request_Location message) a rough location request (step #6) by a message of the PSI (Provide Subscriber Information) type, with as a parameter the IMSI-A identifier of the SMS emitter.

As an answer, the VMSC sends back to the GMLC platform (step #7) a PSI_Ack message for acknowledging the PSI request, this PSI_Ack message containing a LAI (Location Area Identity) field containing the PLMN identifier of the network and the LAC and SAC codes identifying the LA and SA areas of the femtocell from which the SMS has been emitted. Indeed, these LAC and SAC data are known by the VMSC insofar as the subscriber using the mobile phone MS-A has necessarily recorded his location with the network when he has switched his apparatus on and has emitted the SMS. His latter position is hence known by the SGW/FGW gateway and the VMSC.

At receipt of the PSI_Ack messages containing the rough location data, the GMLC platform then tests (step #8) whether the LAC is a specific LAC gathering femtocells or not.

In the affirmative, the GMLC platform sends (step #9) to the VMSC a fine location request, as a PSL (Provide Subscriber Location) request.

At receipt of this PSL request, the VMSC sends (step #10) to the femtocell a Location Reporting Control request (according to the 3GPP specifications), i.e. a request for fine location of the cell used.

Upon receipt of this request, the femtocell collects (step #11):
   the IP address of the Internet box (which, by way of convenience, has been memorized once and for all in the femtocell at reset of the latter after insertion into the Internet box). This IP address allows in particular to find if necessary the physical address and the identity of the subscriber of the ISP owner of the Internet box; and
   the INSEE code of the place where the Internet box (and hence the femtocell) is located. This element of information is known by the ISP because it knows where is located the termination of the wire-based or optical fixed line to which is connected the Internet box, and this element of information had been transmitted to the Internet box at the initialization or the reset of the latter.

These two elements of information, IP address and INSEE code, are transmitted to the VMSC (step #12) by encapsulation in a Location Reporting message (according to the 3GPP specifications), instead of the geographic latitude and longitude coordinates of position of the antenna of the base station, which would have been the information normally transmitted in a conventional Location Reporting message coming from an eNodeB station of a macrocell.

This technique of encapsulation of the information specific to the femtocell instead of the information of conventional geolocation of an antenna of the network allows to use, without modification, the conventional messages and protocols provided by the specifications, hence with no change at the layers of protocol management, conformity control, packet verifications, etc., within the networks involved by this process, both the ISP network and the MNO network.

Of course, other location information, known or obtained within the Internet box or the femtocell, may be used as a variant or as a complement of those mentioned in the present example (IP address and INSEE code).

Upon receipt of the Location Reporting message containing the data relating to the femtocell at the origin of the SMS, the VMSN will transmit these data to the SMSC.

Such transmission may be operated directly by the sending of a specific message, the VMSC and the SMSC having been adapted so as to be able to manage this specific message of transmission of the fine location information.

Another technique consists, as illustrated in FIG. 3, in operating this transmission indirectly via the GMLC platform, using only messages and requests compliant with the 3GPP specifications, hence without any adaptation of the VMSC and SMSC.

For that purpose, the VMSC generates (step #13) a message of the "LCS ticket" (Location Service) type incorporating the fine location information (IP address+INSEE code) in a PSL_Ack (Provide Subscriber Location Acknowledgment) message sent (step #14) to the GMLC platform. This message is an answer to the PSL message of fine location request previously emitted by the GMCL at step #9.

This message is then transmitted to the SMSC (step #15) as a TCP_Request_Location_Ack message. This message is an answer to the TCP_Request_Location message of initial location request previously emitted by the SMSC towards the GMLC platform at step #5.

Based on this information, the SMSC will be able to manage (step #16) an enriched "charging ticket" or CDR (Call Detail Record), including in particular:
   recipient number,
   origin number,
   SMS emission timestamp,
   rough (SAC+LAC) and fine (IP address+INSEE code) location of the femtocell from which the SMS is emitted.

The invention claimed is:
1. A method for locating a short message SMS coming from a mobile user equipment in a telecommunication network comprising:
   a mobile network of a mobile network operator (MNO) comprising:
      a core network with a switching centre (VMSC);
      an SMS storage centre (SMSC); and
      a location platform (GMLC), and a fixed network of an Internet service provider (ISP), comprising a fixed core network and a plurality of individual boxes forming termination equipment of the fixed network, the boxes having respective unique box identification data, some of the boxes being provided with a short-range cellular emitter/receiver module of the femtocell type allowing a temporary wireless coupling with a nearby mobile user equipment, the mobile network being organized into a plurality of location areas (LA) each identified by a location area code (LAC);

each location area gathers a set of service areas (SA) each identified by a service area code (SAC), each service area gathering a geographically homogeneous set of cells of the mobile network;

the femtocells operate in open mode, each femtocell of the mobile network being able to be coupled to any user equipment (MS) registered with the mobile network operator (MNO) and being nearby the femtocell, without this user equipment having been previously registered in the individual box;

wherein upon emission of an SMS from a user equipment (MS) coupled to a femtocell (FT), the method comprises:

a) sending by the SMS storage centre (SMSC) to the location platform (GMLC) platform of a user equipment location request;

b) sending by the location platform (GMLC) to the commutation centre (VMSC) of a rough location request; and c) sending by the commutation centre (VMSC) to the location platform (GMLC) of a rough location comprising the service area code (SAC) and location area code (LAC) corresponding to the femtocell;

d) determining by the location platform (GMLC) whether the location area (LA) includes a specific additional service area SA in which are gathered femtocell identifiers;

e) in the affirmative, sending by the location platform (GMLC) to the femtocell, via the commutation centre (VMSC), of a fine location request message;

f) obtaining by the commutation centre (VMSC) from the femtocell of a fine location comprising unique data of identification of the box associated with the femtocell; and g) transmitting of the fine location (VMSC) by the commutation centre to the SMS storage centre (SMSC).

2. The method of claim 1, wherein the sequence further comprises:

h) generating, by the SMS storage centre (SMSC), of an SMS data ticket (CDR) which comprises the unique box identification data.

3. The method of claim 2, wherein the transmitting of the fine location by the commutation centre (VMSC) to the SMS storage centre (SMSC) comprises:

g1) sending by the commutation centre (VMSC) to the location platform (GMLC) of an answer to said subscriber location request, this answer incorporating said fine location; and g2) transmitting by the location platform (GMLC) to the SMS storage centre (SMSC) of an answer to said subscriber location request, the answer incorporating said fine location.

4. The method of claim 3, wherein said answer to the subscriber location request comprises a PSL_Ack message according to Third Generation Partnership Project (3GPP) specifications.

5. The method of claim 1, wherein the unique box identification data comprise an IP address associated with the box and a geographic code (INSEE code) of a place of location of the box.

6. The method of claim 1, wherein the fine location request message comprises a Location Reporting Control message according to Third Generation Partnership Project (3GPP), specifications and the answer message comprises a Location Reporting message according to the 3GPP specifications.

7. The method of claim 6, wherein the unique box identification data are encapsulated in the Location Reporting message as substitution for the geographic longitude/latitude coordinates.

8. A method of operating a telecommunication network comprising:

making a determination that an SMS message from a mobile phone served by a particular femtocell belongs to a specific additional service area, the cells of specific additional service area comprising femtocells;

in accordance with the determination, sending a fine request location message to obtain unique data identifying fixed terminal equipment which communicates with the mobile phone coupled to the particular femtocell.

9. The method of claim 8, further comprising:

in response to the fine request location message, obtaining the unique data identifying the fixed terminal equipment; and using the unique data identifying the fixed terminal equipment to include fine location of a calling party for the mobile phone in a call detail record.

10. The method of claim 8, wherein the cells of the specific additional service area are all femtocells.

11. The method of claim 8, wherein the fixed terminal equipment comprises a box forming termination equipment of a fixed core network of an Internet service provider (ISP) for the femtocell.

12. The method of claim 8, further comprising obtaining the unique data identifying the fixed terminal equipment, the unique data identifying the fixed terminal equipment comprising an internet protocol (IP) address of the fixed terminal equipment and a code of a place where the fixed terminal equipment is located.

13. The method of claim 8, wherein the fine location message comprises a standardized Location Reporting Control request, and further comprising receiving the unique data identifying the fixed terminal equipment in a standardized Location Reporting message.

14. A telecommunication network entity configured:

to make a determination that an SMS message from a mobile phone served by a particular femtocell belongs to a specific additional service area, the cells of specific additional service area comprising femtocells;

in accordance with the determination, to send a fine request location message to obtain unique data identifying fixed terminal equipment which communicates with the mobile phone coupled to the particular femtocell.

15. The telecommunication network entity of claim 14 further configured:

in response to the fine request location message, to obtain the unique data identifying the fixed terminal equipment; and to use the unique data identifying the fixed terminal equipment to include fine location of a calling party for the mobile phone in a call detail record.

16. The telecommunication network entity of claim 14, wherein the cells of the specific additional service area are all femtocells.

17. The telecommunication network entity of claim 14 further configured, wherein the fixed terminal equipment comprises a box forming termination equipment of a fixed core network of an Internet service provider (ISP) for the femtocell.

18. The telecommunication network entity of claim 14 further configured to obtain the unique data identifying the fixed terminal equipment, the unique data identifying the fixed terminal equipment comprising an internet protocol (IP) address of the fixed terminal equipment and a code of a place where the fixed terminal equipment is located.

19. The telecommunication network entity of claim 14, wherein the fine location message comprises a standardized Location Reporting Control request, and further comprising receiving the unique data identifying the fixed terminal equipment in a standardized Location Reporting message.

20. The telecommunication network entity of claim 14, wherein the entity comprises a Gateway Mobile Location Center (GMLC) platform.

* * * * *